Oct. 1, 1946.                    J. V. RALSTON                    2,408,446
                                CONTROL MECHANISM
                              Filed Sept. 6, 1944                 2 Sheets-Sheet 1
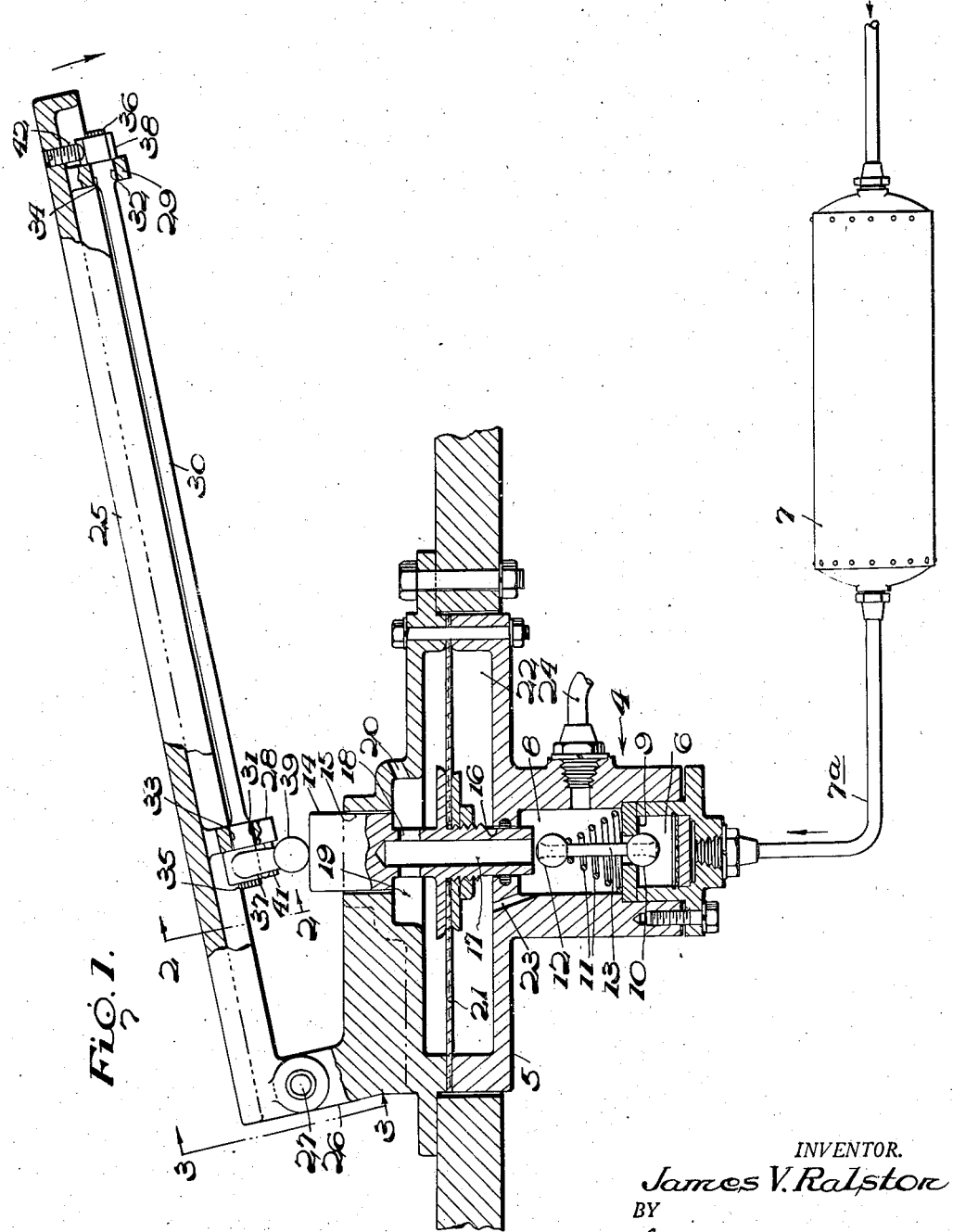
INVENTOR.
James V. Ralston
BY
Scrivener & Parker
ATTORNEYS Oct. 1, 1946.  J. V. RALSTON  2,408,446
CONTROL MECHANISM
Filed Sept. 6, 1944  2 Sheets-Sheet 2
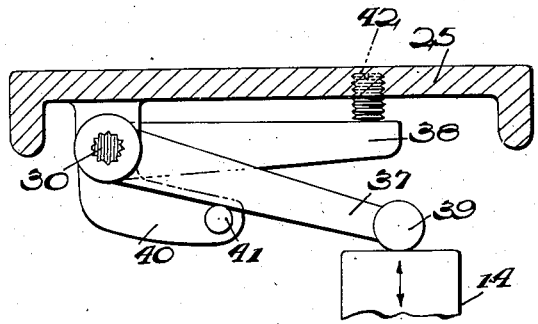
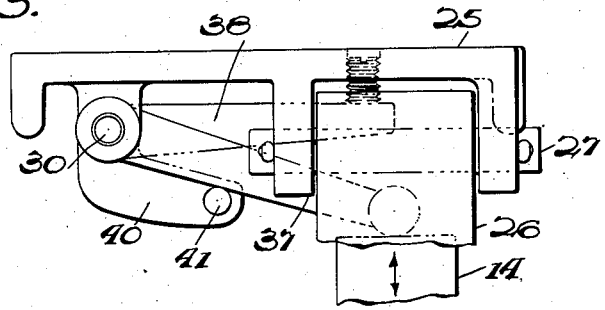
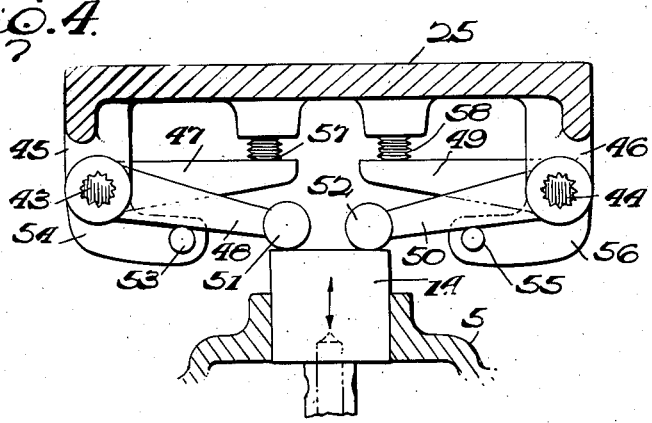
INVENTOR.
James V. Ralston
BY
Scrivener & Parker
ATTORNEYS Patented Oct. 1, 1946

2,408,446

UNITED STATES PATENT OFFICE 2,408,446

CONTROL MECHANISM

James V. Ralston, Elyria, Ohio, assignor to Bendix-Westinghouse Automotive Air Brake Company, Elyria, Ohio, a corporation of Delaware Application September 6, 1944, Serial No. 552,891

7 Claims. (Cl. 74—512)

This invention relates to fluid pressure control mechanism, and more particularly to control valve mechanism of the so-called self-lapping type.

Valves of the self-lapping type are customarily provided with inlet and exhaust valves, an element for operating said valves, a member responsive to the pressure delivered by the valve for controlling the operation of the valve operating element, a control pedal or lever, and resilient means such as a spring for connecting the lever or pedal with the valve operating element. In many of the structures of this type heretofore contemplated, coil springs have been used to effect the resilient connection between the control lever and the valve operating element, and due to the size of these springs it has been difficult to design a self-lapping valve assembly which is sufficiently compact to permit its ready installation on all types of vehicles. It is accordingly one of the objects of the present invention to provide novel and compact resilient means for connecting the control lever with the valve operating element.

Another object of the invention is to provide resilient connecting means of the above type adapted to be mounted directly on the control lever.

Yet another object of the invention is to provide means for initially adjusting the resilient means.

A still further object of the invention is to provide means for adjustably preloading the resilient means in order that operation of the lever may impart a predetermined force to the valve operating element prior to flexing of the resilient means.

Another object of the invention is to provide, in connection with valve mechanism of the above type, resilient connecting means so constituted as to permit the lever or pedal to be symmetrically located with respect to the control valve structure.

The above and other objects will appear more fully hereinafter from the following detailed description when taken in connection with the accompanying drawings illustrating two embodiments of the invention. It is to be expressly understood, however, that the drawings are utilized for purposes of illustration only, and are not designed as a definition of the limits of the invention, reference being had for this purpose to the appended claims.

In the drawings, wherein similar reference characters refer to similar parts throughout the several views;

Fig. 1 is a view, partially in section, of a fluid pressure control valve mechanism constructed in accordance with the principles of the present invention;

Fig. 2 is a partial sectional view of the mechanism taken along line 2—2 of Fig. 1;

Fig. 3 is a view taken along line 3—3 of Fig. 1, and

Fig. 4 is a partial view of the control valve and pedal mechanism illustrating another embodiment of the invention.

Referring more particularly to Fig. 1 of the drawings, a fluid pressure control valve mechanism 4, which may be constructed substantially in accordance with the principles set forth in the patent to William J. Andres and Roy S. Sanford, No. 2,133,275, dated October 18, 1938, comprises in general a casing 5 having an inlet chamber 6 connected with a fluid pressure supply reservoir 7 by means of a conduit 7a, and an outlet chamber 8 adapted to be connected with a fluid pressure actuator. Communication between the chambers 6 and 8 is permitted through a ported partition 9, and communication through this partition is normally prevented by means of an inlet valve 10 normally maintained in closed position by means of an inlet valve spring 11 interposed between the upper surface of the partition and the lower surface of an exhaust valve 12 connected with the valve 10 by means of a valve stem 13. A valve operating element 14 is slidably mounted in bores 15 and 16 formed in the casing, the lower end of this element being provided with a bore 17 adapted to communicate at its lower end with the outlet chamber 8, and at its upper end with atmosphere through ports 18 formed in the element, an exhaust chamber 19 formed in the casing, and an exhaust port 20 which serves to connect the exhaust chamber with atmosphere. A flexible diaphragm 21 is clamped in the casing as shown and is operatively connected at its central portion with the valve operating element. Due to the inherent stiffness of the diaphragm, the valve operating element is normally spaced from the upper surface of the exhaust valve 12 as shown, in order to permit communication between the outlet chamber and atmosphere. The diaphragm also serves, in connection with the casing, to define a diaphragm chamber 22 below the diaphragm, this chamber being connected to the outlet chamber 8 by means of a restricted passage 23. The outlet chamber is provided with an outlet conduit 24 connected thereto, and adapted to be connected at its other end with a fluid actuator to be controlled by the valve mechanism, and it will be understood that with the parts in the position shown, the operation of the valves 10 and 12 is such that communication is prevented between the inlet and outlet chambers, and is permitted between the inlet and outlet chambers, and is permitted between the outlet chamber and atmosphere through the passages heretofore described. In the event the valve operating element is moved downward by suitable means to be described hereinafter, the lower end of the bore 17 first engages the exhaust valve to prevent communication between the outlet chamber and atmosphere, and on further downward movement serves to open the inlet valve in order to permit communication between the inlet chamber and outlet chamber through the ported partition. Since the diaphragm chamber 22 is subjected at all times to the pressure in the outlet chamber by virtue of the restricted passage 23, it will be understood that the pressure supplied to the outlet chamber by the action of the inlet valve will exert an upward force on the diaphragm which will eventually be sufficient to balance the force initially exerted downward on the valve operating element to close the exhaust valve and open the inlet valve, and when the condition occurs the valve operating element will be moved upward to permit closing of the inlet valve by the action of the spring 11. In the event a resilient member is interposed in series between the valve operating element and the valve operating lever, it will be understood that for any given position of the lever, a predetermined degree of compression or deflection will be imparted to the resilient connection, and the resilient connection will then serve to oppose upward movement of the diaphragm in such a manner as to maintain the inlet and exhaust valves in lapped or closed position when the pressure in the outlet chamber and in the diaphragm chamber reaches a predetermined value, this action being well known to those skilled in the art in connection with similar self-lapping valve mechanisms.

In order that this type of control may be effected in the present instance, a control pedal or lever 25 is pivotally mounted on the upper portion of the casing 5 by means of a bracket 26 and a pivot pin 27, the lower surface of the lever being provided with bracket portions 28 and 29 which serve to rotatably support a torsion rod spring 30 provided at either end with bearing portions 31 and 32 adapted respectively to rotate freely in the bracket portions 28 and 29 which are provided with circular bores 33 and 34 for this purpose. Serrated portions 35 and 36 are provided on either end of the spring 30, a lever 37 being mounted on the serrated portion 35 for rotation with the spring, and a lever 38 being similarly mounted on the serrated portion 36 at the other end of the spring. Referring now to Figs. 2 and 3 of the drawings, it will be noted that the lever 37 is provided at its right end with a ball shaped portion 39 adapted to engage the upper end of the valve operation element 14, the pivotal connection of the pedal 25 with the casing 5 being offset to the left as viewed in these figures for this purpose. A bracket 40 is formed on the lower portion of the pedal 25, and is provided at its right end with a pin 41 which serves to engage the lower surface of the lever 37 in order to limit clockwise rotation of the lever with respect to the pedal. The lever 38 likewise extends to the right from the torsion spring 30, the right end of the lever being adapted to engage the lower end of an adjusting screw 42 threadedly received by the pedal 5. Assuming that the levers 37 and 38 are properly positioned on the serrated portions 35 and 34 of the torsion spring rod it will be understood that with the lever 37 positioned as shown in Fig. 2, for example, adjustment of the screw 42 to move the lever 38 in a clockwise direction will serve to tension or preload the torsion spring to any desired value depending on the degree of adjustment, rotation of the lever 37 in a clockwise direction being prevented by the pin 41. Although preloading of the spring is preferable in most cases in connection with the operation of control valve mechanism, it will be understood that the adjusting screw 42 may be so positioned as to eliminate any initial preloading of the torsion spring if desired.

In view of the foregoing, it will be apparent that with the parts as shown in Figs. 1, 2 and 3, downward movement of the pedal, or movement of the pedal in a clockwise direction as viewed in Fig. 1, will serve to move the entire structure including the torsion spring and the levers 37 and 38 downward, whereupon, due to the engagement of the end of the lever 37 with the valve operating element 14, the latter will be moved downward to operate the valves in a manner heretofore described. When the inlet valve 10 is opened, and the pressure increases in the outlet chamber 8 and in the diaphragm chamber 22, the diaphragm will be forced upward by the action of the pressure and will tend to rotate the lever 37 in a counterclockwise direction with respect to the control pedal, thus twisting the torsion spring 30, and it will be clearer that when the force exerted by the torsion spring in one direction balances the force exerted in the other direction by the pressure responsive diaphragm, the inlet valve will be closed by the action of the spring 11 and the valves will be maintained in closed position when the pressure in the outlet chamber and in the diaphragm chamber reaches a value which is proportional to the degree of movement of the control pedal from the position shown, this degree of movement determining the amount of rotation imparted to the torsion spring, and consequently determining the degree of force exerted thereby on the valve operating element through the lever 37. On subsequent release movement of the pedal, the degree of force exerted by the torsion spring on the valve operating element will proportionately decrease and on complete release movement of the pedal, the air pressure acting on the underside of the diaphragm will serve to return the parts to the position shown.

As indicated in the drawings, torsion springs of relatively small over-all size may be utilized to control the operation of valve mechanisms of the type described, and such springs are readily adapted for mounting on the underside of the control pedal or lever without materially increasing the height or weight of the complete assembly. In addition to the foregoing, the torsion spring may be readily adjusted by the operator to provide any desired degree of preloading, which is often particularly advantageous in connection with the control of valve mechanisms of this particular type, as has been more particularly pointed out in the above referred to patent to Andres and Sanford.

Although in the embodiment of the invention just described, rotation of the right end of the torsion spring is prevented by means of the lever 38 and the adjusting screw 42, it is contemplated that in the event this adjustment is considered unnecessary, the serrated portion 36 of the torsion spring may be directly connected to the structure of pedal 25 in order to prevent rotation of this end of the spring with respect to the pedal.

As heretofore stated, it is desirable to offset the pedal with respect to the vertical axis of the valve operating element 14 in order to permit the end of the lever 37 to engage the upper end of the element. In many cases, it is desirable to have the longitudinal center line of the pedal substantially coincide with the vertical axis of the valve operating element, and this desirable end may be readily accomplished by means of a structure illustrated in Fig. 4 of the drawings. Referring more particularly to the latter figure, it will be noted that a pair of torsion springs 43 and 44 are positioned on either side of the pedal 5, the ends of these springs being rotatably supported in suitable brackets such as the brackets 45 and 46, the supporting means being identical with that used for supporting the spring 30 shown in Fig. 1. The opposite ends of the springs 43 and 44 are likewise serrated and are in engagement with corresponding serrations formed respectively in levers 47 and 48, and 49 and 50. The levers 48 and 50 are provided respectively with ball ends 51 and 52, both adapted to engage the upper end of the valve operating element 14. These levers, as well as the levers 47 and 49, extend inwardly from the springs toward the center of the pedal, rotation of the lever 48 in a clockwise direction being limited by means of a pin 53 carried by a bracket 54 formed on the pedal, and rotation of the lever 50 in a counter-clockwise direction being limited by means of a pin 55 carried by a bracket 56, likewise formed on the pedal. In order that the levers 48 and 50 may be normally maintained against the stops or pins 53 and 55 when the pedal is in released position, adjusting screws 57 and 58 are threadedly received by the pedal, the lower ends of these screws being adapted respectively to engage the inner ends of the levers 47 and 49. Thus the screws 57 and 58 may be so adjusted as to insure contact between the levers 48 and 50 and the pins 53 and 55, or they may be adjusted to move the levers 47 and 49 in clockwise and counter-clockwise directions respectively, in order to preload or pretension the springs 43 and 44, this preloading being accomplished in the same manner as heretofore described in connection with a torsion spring 30 as shown in Fig. 1. The torsion springs 43 and 44 are preferably identical, and this being the case, it will be apparent that the springs may be initially so adjusted as to impart equal forces to the valve operating element 14 on downward movement of the pedal to operate the control mechanism. It is likewise contemplated that it may be desirable under certain conditions of operation, to have one of the torsion springs become effective to move the valve operating element 14 after the other spring becomes effective, and in this event the adjusting screws 57 and 58, for example, may be so adjusted as to permit engagement between the lower end of only one of the adjusting screws and the corresponding lever when the parts are in the position shown in Fig. 4, in which case, initial downward movement of the pedal which serves to twist one of the springs, while further movement of the pedal will cause the other lever to abut the corresponding adjusting screw, and thereafter both springs would be effective to impart force to the valve operating element. By virtue of the construction shown in Fig. 4, simple and effective resilient connecting means are provided between the control pedal and the valve operating element, and the arrangement is such as to permit an equal transmission of forces from the pedal to the element through each of the torsion springs, and at the same time to permit the pedal to be symmetrically located with respect to the center line of the control valve mechanism.

While one embodiment of the invention has been shown and described herein with considerable particularity, it is to be understood that the invention is not limited thereto but is capable of a variety of expressions, as will now be readily apparent to those skilled in the art. Reference will, therefore, be had to the appended claims for a definition of the limits of the invention.

What is claimed is:

1. Actuating mechanism for a movable member comprising a pivotally mounted lever, a pair of spaced bearings on the lever, a torsion spring rod rotatably mounted in said bearings, a second lever mounted on one end of the spring rod for rotation therewith having its end in engagement with the member, a third lever mounted on the other end of the spring rod for rotation therewith, and an adjusting screw carried by said first named lever and adapted to engage said third lever for adjusting the angular position of the latter with respect to the first named lever.

2. Actuating mechanism for a movable member comprising a pivotally mounted lever, a pair of spaced bearings on the lever, a torsion spring rod rotatably mounted in said bearings, a second lever mounted on one end of the spring rod for rotation therewith having its end in engagement with the member, a third lever mounted on the other end of the spring rod for rotation therewith, and means for adjustably preloading said torsion spring rod for providing a non-yielding connection between the first named lever and member when the force exerted on the member by the second lever is less than a predetermined value and for providing a yielding connection when said force exceeds said predetermined value, said means comprising a stop on the first named lever for limiting rotation of the second lever in one direction and an adjusting screw on the first named lever for engaging and rotating said third lever in said one direction to tension the latter.

3. Actuating mechanism for a movable member comprising a control pedal pivotally mounted at one end, a pair of spaced bearings on the under side of said pedal having a common axis substantially parallel with the longitudinal center line of the pedal, a torsion spring rod mounted for rotation in said bearings, a lever mounted on one end of said rod adjacent the pivotally mounted end of the pedal having its outer end in engagement with said member, a second lever mounted on the other end of the rod for rotation therewith, and means for adjusting the angular position of said second lever relative to the pedal whereby the pedal is adjustably positioned relative to said member.

4. Actuating mechanism for a movable member comprising a pivotally mounted lever, a torsion spring rod positioned substantially parallel with the longitudinal center line of said lever, a bearing on the lever adapted to support one end of the rod for rotation in said bearing, a second lever rigidly mounted on said one end of said rod adjacent said bearing and having its outer end in engagement with said member, and means associated with said first named lever and with the other end of said rod for preventing rotation of said other end when the first named lever is moved to effect actuation of said member through said rod and second lever.

5. Actuating mechanism for a movable member comprising a control pedal pivotally mounted at one end, a pair of torsion spring rods positioned on said pedal substantially parallel to each other and with the longitudinal center line of the pedal and spaced at substantially equal distances on opposite sides of said center line, bearings on the pedal for rotatably supporting the ends of said rods adjacent said one end of the pedal, inwardly extending levers rigidly mounted on said ends of said rods having their ends in engagement with said member, bearings on the pedal for rotatably supporting the other ends of said rods, and means associated with the pedal and said other ends of said rods for adjusting the angular positions of said other ends in the corresponding bearings and for preventing rotation of said other ends of said rods from said angular positions when the pedal is operated to effect actuation of said member through said spring rods and levers.

6. Actuating mechanism for a movable member comprising a control pedal pivotally mounted at one end, a pair of torsion spring rods positioned on said pedal substantially parallel to each other and with the longitudinal center line of the pedal and spaced at substantially equal distances on opposite sides of said center line, bearings on the pedal for rotatably supporting the ends of said rods adjacent said one end of the pedal, inwardly extending levers rigidly mounted on said ends of said rods having their ends in engagement with said member, bearings on the pedal for rotatably supporting the other ends of said rods, stops on the pedal for limiting rotation of one of said levers in one direction and rotation of the other lever in the opposite direction, and means for adjusting the angular positions of said other ends of said rods whereby said rods are tensioned to maintain said levers against said stops with predetermined forces.

7. Actuating mechanism for a movable member comprising a control pedal pivotally mounted at one end, a pair of torsion spring rods positioned on said pedal substantially parallel to each other and with the longitudinal center line of the pedal and spaced at substantially equal distances on opposite sides of said center line, bearings on the pedal for rotatably supporting the ends of said rods adjacent said one end of the pedal, inwardly extending levers rigidly mounted on said ends of said rods having their ends in engagement with said member, bearings on the pedal for rotatably supporting the other ends of said rods, stops on the pedal for limiting rotation of one of said levers in one direction and the other of said levers in the opposite direction, inwardly extending levers rigidly mounted on the other ends of said rods, and adjusting screws carried by said pedal adapted to engage said last named levers and to move them in opposite directions, whereby the torsion rods are tensioned in opposite directions and the first named levers are maintained against said stops until the forces exerted on the member thereby on movement of said pedal in one direction exceed predetermined values.

JAMES V. RALSTON.